United States Patent [19]

Caldwell

[11] Patent Number: 5,869,166
[45] Date of Patent: Feb. 9, 1999

[54] HIGH SOLIDS, LOW SHRINKAGE COATING

[75] Inventor: Kenneth G. Caldwell, Mountville, Pa.

[73] Assignee: Armstrong World Industries, Inc., Lancaster, Pa.

[21] Appl. No.: 949,370

[22] Filed: Oct. 14, 1997

Related U.S. Application Data

[63] Continuation-in-part of Ser. No. 747,233, Nov. 12, 1996, abandoned.

[51] Int. Cl.[6] ........................................................ B32B 5/16
[52] U.S. Cl. ........................... 428/142; 428/143; 428/148; 428/150; 428/332; 428/339; 524/493; 524/522; 524/524; 106/801; 106/803; 106/811; 106/814; 106/816
[58] Field of Search ..................................... 524/425, 427, 524/446, 449, 493, 451, 522, 524; 428/142, 143, 332, 339, 148, 150; 106/801, 803, 811, 814, 816

[56] References Cited

U.S. PATENT DOCUMENTS 2,411,470  11/1946  Patton ...................................... 524/450
4,559,377  12/1985  Gleason et al. ...................... 524/450 X

FOREIGN PATENT DOCUMENTS 1015704  1/1966  United Kingdom ................... 524/450

*Primary Examiner*—Fred Teskin

[57] ABSTRACT

Using a combination of relatively coarse filler and latex binder, a very high solids coating (about 85% or higher) can be produced with a relatively low working viscosity. These very high solids coatings can be applied in thick single layers and oven cured without cracking. They maintain more than 80% of their original wet thickness. The resulting coating provides an extremely hard and durable surface, even on relatively soft mineral fiber board ceiling tiles or wall panels.

4 Claims, No Drawings

5,869,166

HIGH SOLIDS, LOW SHRINKAGE COATING

CROSS-REFERENCE TO RELATED APPLICATION

This application is a continuation-in-part of U.S. Ser. No. 747,233, filed Nov. 12, 1996, entitled "High Solids, Low Shrinkage Coating", now abandoned.

BACKGROUND OF THE INVENTION

Field of the Invention

The invention is a coating, particularly useful for ceiling panels. Advantageously, the coating can be sprayed onto the panel, and furthermore, can be put on and dried to obtain a substantially thick coating without cracking.

U.S. Pat. No. 4,456,507 discloses a method of applying aqueous chip resistant coating compositions. The composition includes a film forming latex binder and a filler mixed with the binder to form a composition having a viscosity of at least 5,000 centipoise. Preferably, the chip resistant coating will be applied by spraying techniques, and the coating will preferably have a binder:filler ratio ranging from 10 to 90% binder:90–10% filler and will exhibit a viscosity of at least 10,000 centipoise. Calcium carbonate may be used as a filler. The coating has an extremely high solid content (70–90%).

U.S. Pat. No. 4,413,026 discloses a composition for coating surfaces such as roofs and the like. The composition includes about 40 to 80% by volume of particles of polystyrene foam plastic particles, in a mixture with about, correspondingly, 60 to 20% by volume of an aqueous synthetic resin latex. Example I shows use of ground limestone as a filler. Shrinkage due to evaporating is usually much less than 10%. A final blend is coated on a roof at a thickness of 0.25".

U.S. Pat. No. 4,559,377 discloses a ceiling board coating. The coating includes about 10 to 30, preferably 15.3, weight percent acrylic latex. The coating also includes one or more particulate fillers selected from a group consisting of clay, such as 200–300 mesh smectite clay, or calcium carbonate having a particle size up to 12 microns. The coating can be applied through a brush or through a small orifice nozzle.

U.S. Pat. No. 4,221,697 discloses stable, fluid, moldable and curable compositions from which may be fabricated composite materials. The fluid compositions comprise a polymerizable organic liquid having a viscosity not greater than 50 poise at molding temperature and inorganic filler particles constituting at least 20% by volume and, optionally, up to 90% by volume.

U.S. Pat. No. 4,735,027 is merely noted for disclosing a coating for wallboard which does not crack or shrink as it drys.

SUMMARY OF THE INVENTION

Using a relatively coarse filler (average particle size about 75 to about 350 microns) together with a latex binder, a very high solids coating (at about 85% or higher) can be made with a relatively low working viscosity (up to about 5,000 cps or less). Although thicknesses as low as about 1 mil can be used, these very high solids coatings can preferably be applied to obtain thick single layers (0.010" or thicker). In addition to this, the coatings can be oven cured without mudcracking (cracking due to shrinkage). These coatings retain 82% or more of their original wet thickness upon oven curing. This allows thick single coat applications not possible with typical lower solids coatings.

The resulting coating is extremely hard and durable. When applied to a relatively soft mineral fiber substrate, these coatings provide excellent impact resistance and abrasion resistance. Because of the relatively low working viscosity of these coatings, a number of application methods are possible, including spray coating. Furthermore, the coating can be spray coated at a low pressure of from about 10 to about 60 psi (pounds per square inch).

DESCRIPTION OF THE INVENTION

By using a relatively coarse filler (average particle size about 75 to about 350 microns) together with a latex binder, a very high solids coating (at about 85% or higher) can be made with a relatively low working viscosity (5,000 cps or less). In preferred embodiments these very high solids coatings are uniquely capable of being applied in very thick single layers (0.010–0.050 or thicker) and cured without mudcracking. Additionally, these coatings retain 82% or more of their original wet thickness after oven drying and curing. Typical paints lose up to 50% of original wet thickness and would show mudcracking in the thicker applications. Because of the low shrinkage character of these coatings, thicker single layers can be applied and cured without significant thickness loss or mudcracking. The preferred formulation is:

| Ingredient | Trademark Name | Company | Purpose | % By Weight |
|---|---|---|---|---|
| Water | | | Vehicle | 7.43 |
| Acrylic Latex* | Carbobond 26373 | B. F. Goodrich | Binder | 16.25 |
| Sodium Polyacrylate | Tamol 731 | Rohm & Haas | Dispersing Agent | 0.56 |
| Titanium Dioxide* | Tipure R-901 | Dupont Chemicals | Opacifier | 3.01 |
| Dolomite* | Dolofil 2055 | Specialty Minerals | Extender Pigment | 72.44 |
| Polyether Polysiloxane | Tego Foamex 1488 | Goldschmidt Chemical | Antifoam | 0.14 |
| Acrylic Emulsion | Acrysol TT-615 | Rohm & Haas | Thickener | 0.17 |

Solids = 85%
Particle size = about 125 microns
Viscosity = about 3000 cps
Thicknesses = 10–50 mils
*Contributes solids to the 85% minimum by weight.

In the preferred formula, a 40 mesh limestone (particle size of about 125 microns) is combined with an acrylic latex to make an 85% solids coating with a 5 to 1 filler to binder ratio. The resulting coating, when applied in thicknesses of 0.015" or greater, provides an extremely hard and durable surface, even on relatively soft mineral fiber board ceiling tiles. Because of the relatively low working viscosity of the coating mixture, it can be applied a number of ways, including spray coating. Other formulations are:

| Ingredient | Trademark Name | Company | Purpose | % By Weight |
|---|---|---|---|---|
| Water | | | Vehicle | 2.06 |
| Acrylic Latex* | Carbobond 26373 | B. F. Goodrich | Binder | 17.19 |
| Sodium Polyacrylate | Tamol 731 | Rohm & Haas | Dispersing Agent | 0.59 |
| Titanium Dioxide* | Tipure R-901 | Dupont Chemicals | Opacifier | 3.19 |
| Dolomite* | DF 3015 | Specialty | Extender | 76.64 |

-continued

| Ingredient | Trademark Name | Company | Purpose | % By Weight |
|---|---|---|---|---|
| Polyether Polysiloxane | Tego Foamex 1488 | Minerals Goldschmidt Chemical | Pigment Antifoam | 0.15 |

Solids = 90%
Particle size = about 350 microns
Viscosity = about 5000 cps
Thicknesses = 10–50 mils
*Contributes solids to the 90% minimum by weight.

| Ingredient | Trademark Name | Company | Purpose | % By Weight |
|---|---|---|---|---|
| Water | | | Vehicle | 7.43 |
| Polyvinyl Acetate* | Vinac 521P | B. F. Goodrich | Binder | 16.25 |
| Sodium Polyacrylate | Tamol 731 | Rohm & Haas | Dispersing Agent | 0.56 |
| Titanium Dioxide* | Tipure R-901 | Dupont Chemicals | Opacifier | 3.01 |
| Calcium Carbonate* | Micro White 450 | ECC International | Extender Pigment | 72.44 |
| Polyether Polysiloxane | Tego Foamex 1488 | Goldschmidt Chemical | Antifoam | 0.14 |
| Acrylic Emulsion | Acrysol TT-615 | Rohm & Haas | Thickener | 0.17 |

Solids = 85%
Particle size = about 75 microns
Viscosity = about 5000 cps
Thicknesses = 10–50 mils
*Contributes solids to the 85% minimum by weight.

The solids are comprised of a dolomite extender pigment and acrylic latex binder. Other extender pigments can include calcium carbonate, Kaolin clay, mica, talc, or silica as long as the average particle size range is between 75 and 350 microns. The binder can also be aqueous lattices of polyvinyl acetate, vinyl acrylic, urethane acrylic, styrene acrylic, epoxy, ethylene vinyl chloride, vinylidene chloride, or polyvinyl chloride.

This coating could provide very high performance ceiling tiles or wall panels with very hard and durable surfaces. Such products could potentially compete with other high performance ceilings such as metal pan. These coatings may also be good substitutes for vinyl laminates to impart durability and cleanability to ceiling tiles or wall panels. The finish can be either smooth or textured depending on the substrate to which they are applied. Also, with the addition of small amounts of colored particles, a variegated look can be achieved.

What is claimed is:

1. An aqueous coating composition comprising water, a binder and a total solids content of at least 85% with said solids being comprised of particles which have an average particle size of from about 75 to about 350 microns, said composition being sprayable at a low pressure of from about 10 to about 60 psi with viscosities ranging up to 5000 cps.

2. An aqueous coating composition as set forth in claim 1 wherein the solids include particles selected from the group consisting of calcium carbonate, clay, mica, talc, and silica.

3. A ceiling board with a coating comprising:

(a) a fibrous ceiling board with a face surface; and (b) a high solids, low shrinkage coating applied to the face surface comprising water, a binder and a total solids content of at least about 85% with said solids being comprised of particles having an average particle size in a range of from about 75 to about 350 microns, said composition being sprayable at a low pressure in a range of from about 10 to about 60 psi with viscosities ranging up to 5000 cps.

4. An ceiling board as set forth in claim 3 wherein said coating composition has a coating thickness in a range of from about 0.010 inch to about 0.050 inch.

* * * * *